(12) United States Patent
Basinger

(10) Patent No.: US 8,562,050 B1
(45) Date of Patent: Oct. 22, 2013

(54) SELF-ALIGNING AND ENGAGING CONCRETE CYLINDER AND MOLD LIFTING TOOL

(71) Applicant: Douglas K. Basinger, Indian Head, PA (US)

(72) Inventor: Douglas K. Basinger, Indian Head, PA (US)

( * ) Notice: Subject to any disclaimer, the term of this patent is extended or adjusted under 35 U.S.C. 154(b) by 0 days.

(21) Appl. No.: 13/734,233

(22) Filed: Jan. 4, 2013

(51) Int. Cl.
*A63B 47/02* (2006.01)

(52) U.S. Cl.
USPC ............................. 294/115; 294/110.1; 294/90

(58) Field of Classification Search
USPC .................. 294/115, 66.1, 100, 110.1, 90
See application file for complete search history.

(56) References Cited

U.S. PATENT DOCUMENTS

| | | | | |
|---|---|---|---|---|
| 1,453,301 A | * | 5/1923 | Winkler | ........................ 294/22 |
| 2,358,632 A | * | 9/1944 | Gerken | ........................ 294/50.8 |
| 4,359,241 A | * | 11/1982 | Kistner | ........................ 294/82.13 |
| 5,342,104 A | * | 8/1994 | Sato et al. | ........................ 294/74 |
| 6,766,609 B1 | * | 7/2004 | Aboczky | ........................ 43/53.5 |
| 7,278,671 B1 | | 10/2007 | Herford | |
| 2010/0140968 A1 | | 6/2010 | McClenaghan et al. | |

\* cited by examiner

*Primary Examiner* — Paul T Chin
(74) *Attorney, Agent, or Firm* — David G. Oberdick; Peter J. Borghetti

(57) ABSTRACT

Self-aligning and engaging concrete cylinder and mold lifting tool including a plurality of arms pivotally connected to a rod. The rod travels thru a tube and is connected to a handle. The plurality of arms are also pivotally connected to the tube. The plurality of arms are actuated in unison, synchronously, simultaneously, or otherwise to move together radially by lifting the handle up and down. Thus when the handle is drawn upward, the plurality of arms close around the circumference of the concrete cylinder mold. The circumference of the concrete cylinder mold can be any diameter ranging between the fully extension diametrical position of the plurality of arms and the fully retracted diametrical position of the plurality of arms. A demolded concrete cylinder gripper attachment can be removable attached to the lifting lugs to securely engage the demolded concrete cylinder for lifting and moving the demolded concrete cylinder.

20 Claims, 4 Drawing Sheets

SELF-ALIGNING AND ENGAGING CONCRETE CYLINDER AND MOLD LIFTING TOOL

FIELD OF THE INVENTION

The present invention is related generally to the field of safety equipment, in particular to a concrete cylinder mold lifting that allows for easy movement of a mold from place to place.

BACKGROUND OF THE INVENTION

The present way to move newly filled concrete cylinder molds is to tilt them slightly, slide a trowel under the bottom, and lift and carry them to place of curing (e.g., curing box). Most people pick them up by placing their fingertips under the lip of the mold and carrying them this way. This process can cause back strain because the user must bend over too far.

SUMMARY OF THE INVENTION

The present invention is a grapple type device. It has a plurality of arms pivotally connected to a rod. The rod travels thru a tube and is connected to a handle. The plurality of arms are also pivotally connected to the tube. The plurality of arms are actuated in unison, synchronously, simultaneously, or otherwise move together radially by lifting the handle up and down. Thus when the handle is drawn upward, the plurality of arms close around the circumference of the concrete cylinder mold. The circumference of the concrete cylinder mold can be any diameter ranging between the fully extension diametrical position of the plurality of arms and the fully retracted diametrical position of the plurality of arms. Further, lifting the handle when the present invention is positioned on top of the concrete cylinder mold results in the plurality of arms sliding up the concrete cylinder mold to grasp or engage the concrete cylinder mold under the lip, and thereby lifting the mold safely.

For a better understanding of the present invention, reference is made to the accompanying drawings and detailed description.

BRIEF DESCRIPTION OF THE DRAWINGS

The present invention is illustratively shown and described in reference to the accompanying drawings, in which:

FIG. 1B is a top view of a substantially circular structure disposed on the distal end of the tube of the exemplary embodiment of FIG. 1A;

DETAILED DESCRIPTION OF THE INVENTION

As used herein in the specification and claims, including as used in the examples and unless otherwise expressly specified, all numbers may be read as if prefaced by the word "about", even if the term does not expressly appear. Also, any numerical range recited herein is intended to include all subranges subsumed therein.

Figure 1A:
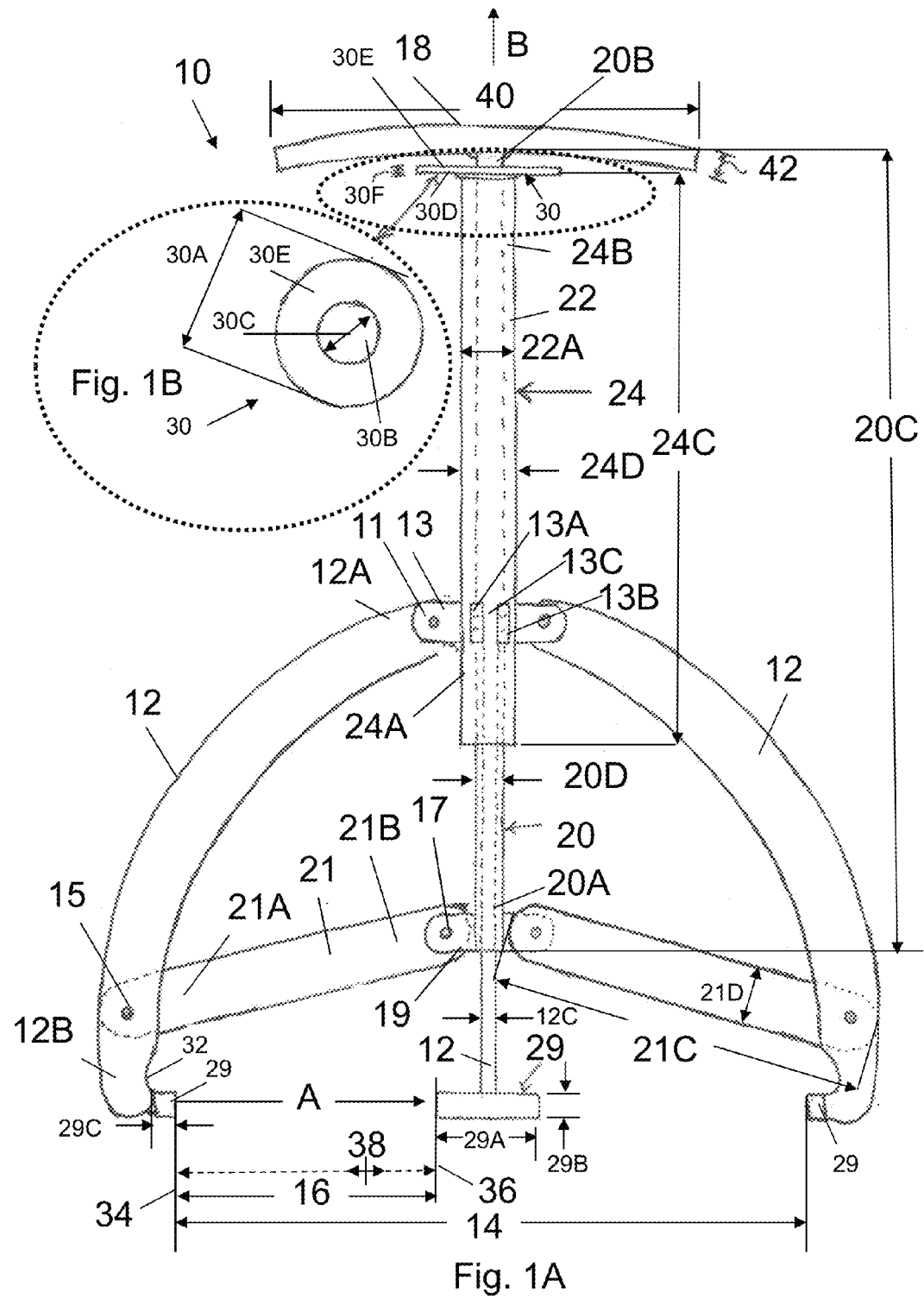
FIG. 1A is a side view showing an exemplary embodiment of the present invention having three arms assembled and a fourth arm, typically assembled between upper lugs 13A and 13B, removed for illustration purposes.
Figure 2:
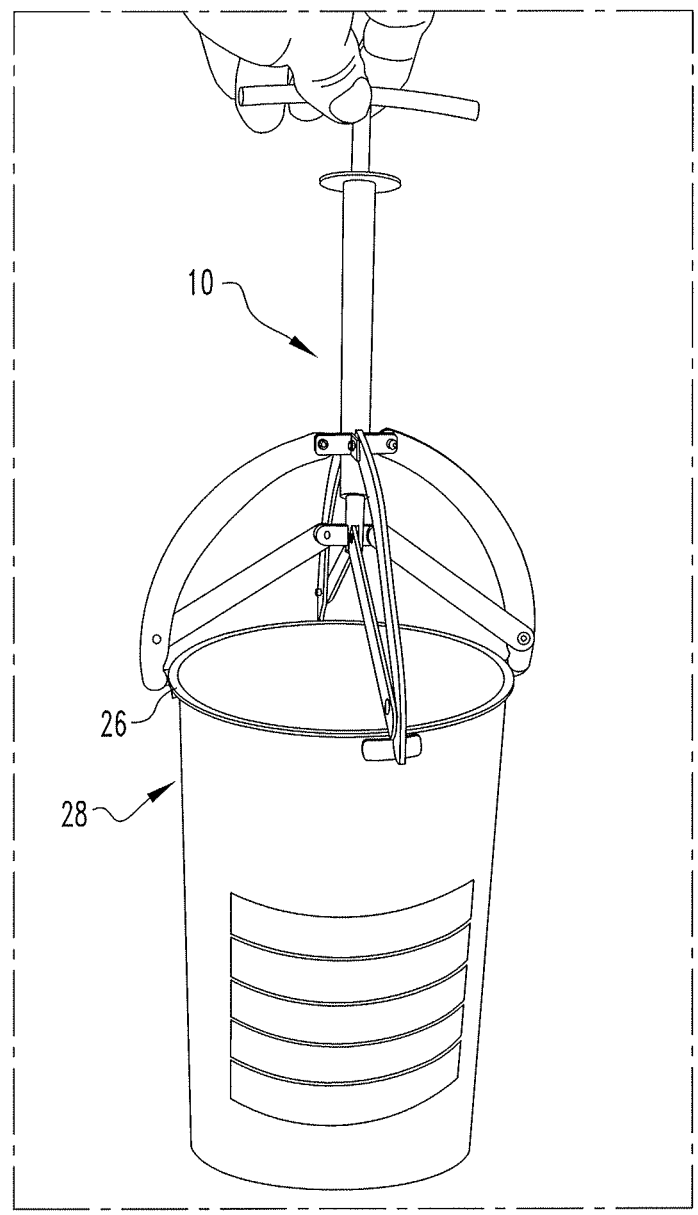
FIGS. 2 and 3 are pictorial views of the exemplary embodiment of FIG. 1 in use to lift a concrete cylinder mold.

Now turning to FIG. 1A for an illustration of the present invention grapple type device 10 that has a plurality of arms 12 capable of being extended or retracted between a first or fully retracted radial position 36 and a second or fully extended radial position 34, and any intermediate position 38 there between. One embodiment of the intermediate position 38 can correspond to the radial dimension equivalent to an outer diameter of a concrete cylinder mold 28 juxtaposition a lip 26 of the concrete cylinder mold 28 (FIG. 2). The first or fully retracted position 36 can be defined by a radial position where lifting lugs 29 contact each other.

Embodiments of present invention 10 can include only two arms, only three arms, only four arms (shown in illustrations herein), or more arms depending on the user's needs. The number of linking or extension members 21 (discussed in detail below) will directly (one-for-one) coincide with the number of arms.

The movement of arms 12 are in unison, synchronized, simultaneous, or otherwise move together with a single movement of a single handle 18 by the user with one hand. The upward force to lift handle 18 causes arms 12 to actuate radially inward from the second or fully extended radial position 34 toward the first or fully retracted radial position 36 after grapple type device 10 is positioned on top of concrete cylinder mold 28. The user does not need to deliberately position or place any lifting lugs 29 under lip 26 of the concrete cylinder mold 28. The present invention 10 does not need to be centered on the concrete cylinder mold 28 prior to actuation of handle 18. The present invention 10 will self-align and engage with the concrete cylinder mold 28 as handle 18 is lifted without additional intervention by the user.

The shape of handle 18 is not limited to the arched-shape illustrated herein. The arms can be shaped to any geometry required to meet customer specifications and requirements. One embodiment of the arch-shaped handle 18 having a longitudinal length 40 of 4 inches, thickness or diameter 42 of 0.25 inches and can have an arch equivalent to a 12 inch radius (not illustrated).

One embodiment of present invention 10 includes arms 12 that have a distal end 12A is pivotally connected to tube 24 juxtaposition the proximal end 24A of the tube 24, for example, distal end 12A is pivotally connected at pivot point 11 to upper lugs 13. One embodiment of upper lugs 13 is one upper lug 13 fixedly connected substantially perpendicular to or radially outward disposed from tube 24 in proximity of the proximal end 24A of the tube 24, wherein one distal end 12A of one arm 12 is pivotally connected to one upper lug 13 (not shown). Another embodiment of the upper lugs 13, as shown in FIG. 1A, includes the two upper lugs 13A, 13B oriented in a paired configuration to form a space 13C there between greater than the thickness 12C (not shown) of arm 12, wherein distal end 12A of arm 12 is received in space 13C between the paired upper lugs 13A, 13B and pivotally connected to the paired upper lugs 13A, 13B.

One embodiment of present invention 10 includes arms 12 that have proximal end 12B pivotally connected at pivot point 15 to a distal end 21A of linkage or extension members 21, wherein proximal end 21B of linkage or extension members 21 can be pivotally connected at pivot point 17 to perpendicularly or radially outward disposed lower lugs 19 fixedly connected to proximal end 20A of longitudinal rod 20. One embodiment of present invention 10 can be one arm 12 pivotally connected to one lower lug 19. Each arm 12 includes a lifting lug 29 disposed in proximity of proximal end 12B of arm 12 capable of engagement of a lower surface of a container lip 26. Arms 12 also include a thickness 12C (not shown). One embodiment of arm 12 includes an inwardly facing undercut 32 adjacent to the lifting lug 29 to receive a lip 26 of a concrete cylinder mold 28. One embodiment of arms 12 includes length of 5.875 inches, width of 0.5625 inches, outside radius 4.25 inches, thickness of 1.125 inches, and arc of 90 degrees. Lifting lug 29 can be integral with arm 12 or welded to proximal end 12B of arm 12. One embodiment of lifting lug 29 can include length 29A of 1.0 inches, thickness 29B of 0.25 inches, and depth 29C of 0.125 inches.

Continuing with FIG. 1A, grapple type device 10 can include four arms 12 that are actuated radially inward in direction A from a fully extended diameter 14, referred to as second or fully extended radial position 34, along a radial distance or path 16 to a fully retracted diametrical position 36, referred to as first or fully retracted radial position 36, by lifting handle 18 in direction B (perpendicular to direction A) connected to distal end 20B of longitudinal rod 20, which longitudinally travels within through-bore 22 thru tube 24 from proximal end 24A to distal end 24B along length 24C. The longitudinal rod 20, the tube 24, and the handle 18 are perpendicularly oriented relative to the radial path 16 of the lifting lug 29. Thus, when handle 18 is drawn upward in direction B, lifting lugs 29 close around the circumference of the lip 26 of concrete cylinder mold 28 (see FIGS. 2 and 3). Further lifting of handle 18 results in lifting lug 29 of arms 12 sliding up the outer surface of concrete cylinder mold 28 to engage under lip 26, and thereby lift concrete cylinder mold 28 and reduce back strain. The shape of arms 12 are not limited to the curve-shape illustrated herein. The arms can be shaped to any geometry required to meet customer specifications and requirements.

One embodiment of tube 24 includes proximal end 24A, distal end 24B, through-bore 22 from proximal end 24A to distal end 24B, a length 24C, an outer diameter 24D, wherein the through-bore 22 includes an inner diameter 22A. One exemplary embodiment includes length 24C of 5.5 inches, outer diameter of 0.5 inches, inner diameter 22A of 0.375 inches.

One embodiment of longitudinal rod 20 include proximal end 20A, distal end 20B, length 20C, and outer diameter 20D, wherein the outer diameter 20D is smaller than the inner diameter 22A of the through-bore 22 of the tube 24 such that the longitudinal rod 20 freely traverses within the through-bore 22 of the tube 24. Further, length 20C of longitudinal rod 20 is greater than length 24C of tube 24. One embodiment of longitudinal rod 20 includes diameter 20D of 0.25 inches and length 20C of 7.5 inches.

As mentioned above, one embodiment of longitudinal rod 20 includes handle 18 connected to distal end 20B of longitudinal rod 20 such that contact of handle 18 with distal end 20B of tube 24 stops to traversal of longitudinal rod 20 through the through-bore 22 of the tube 24.

As mentioned above, one embodiment of each linkage or extension member 21 of the plurality of extension members 21 includes a distal end 21A and a proximal end 21B, wherein the proximal end 21B of each extension member 21 is pivotally connected juxtaposition the proximal end 20A of the longitudinal rod 20, and wherein the distal end 21A of each extension member 21 is pivotally connected juxtaposition the proximal end 12B of each arm 12 of the plurality of arms 12. Each extension member 21 radially extends the pivotally connected arm 12 as a portion of the longitudinal rod 20 traverses through the through-bore 22 of the tube 24 from the proximal end 24A of the tube 24 towards the distal end 24B of the tube 24. The shape of linkage or extension member 21 is not limited to the straight configuration as illustrated herein. The arms can be shaped to any geometry required to meet customer specifications and requirements. One embodiment of linkage or extension member 21 includes length 21C of 4.0 inches, width 21D of 0.5625 inches, and thickness (not shown) of 0.125 inches. The plurality of arms 12 radially extend or retract in unison, synchronized, simultaneous, or otherwise move together between a first radial position 36 and a second radial position 34 as the longitudinal rod 20 traverses through the through-bore 22 of the tube 24 with a single movement of the handle 18.

Now turning to FIG. 1B illustrating a substantially circular structure 30 having an outer diameter 30A, a center hole 30B with a diameter 30C, a lower surface 30D (FIG. 1A), an upper surface 30E and a thickness 30F (FIG. 1A). The diameter 30C of the center hole 30B is greater than the outer diameter 20D of the longitudinal rod 20. The lower surface 30D of the structure 30 is configure to support two fingers of the user on opposing sides of the tube 24. The structure 30 is connected to the distal end 24B of the tube 24. The upper surface 30E contacts the handle 18 to stop the traversal of the longitudinal rod 20 through the through-bore 22 of the tube 24, whereby the user can traverse the longitudinal rod 20 through the through-bore 22 of the tube 24 using one hand by depressing down on the handle 18 with a third finger or a thumb of the user to extend the plurality of arms 12 and pushing up on the handle 18 with the third finger or the thumb of the user to retract the plurality of arms 12. One embodiment of structure 30 can include diameter 30C of 0.5625 inches, outer diameter 30A of 1.375 inches, and thickness 30F of 0.0625 inches.

One example of a concrete cylinder mold 28 includes a 6 inch diameter and 12 inch length, and can weigh 28 pounds when filled with concrete. Grapple type device 10 enables a person to get a more secure grip on concrete cylinder mold 28 by reason of the plurality of arms 12 being equally spaced apart by a predetermined angular degree (360 degrees divided by number of arms 12). Some examples, but not to limit the scope of the invention, include the following:

A.) If the plurality of arms 12 are only two arms, then the predetermined angular degree is 180 degrees (360 degrees divided by 2 arms);

B.) If the plurality of arms 12 are only three arms, then the predetermined angular degree is 120 degrees (360 degrees divided by 3 arms); and C.) If the plurality of arms 12 are only four arms, then the predetermined angular degree is 90 degrees (360 degrees divided by 4 arms);

D.) If the plurality of arms 12 are only five arms, then the predetermined angular degree is 72 degrees (360 degrees divided by 5 arms);

E.) If the plurality of arms 12 are only six arms, then the predetermined angular degree is 60 degrees (360 degrees divided by 6 arms); and F.) If the plurality of arms 12 are only seven arms, then the predetermined angular degree is 51.4 degrees (360 degrees divided by 7 arms);

G.) If the plurality of arms 12 are only eight arms, then the predetermined angular degree is 45 degrees (360 degrees divided by 8 arms).

Figure 3:
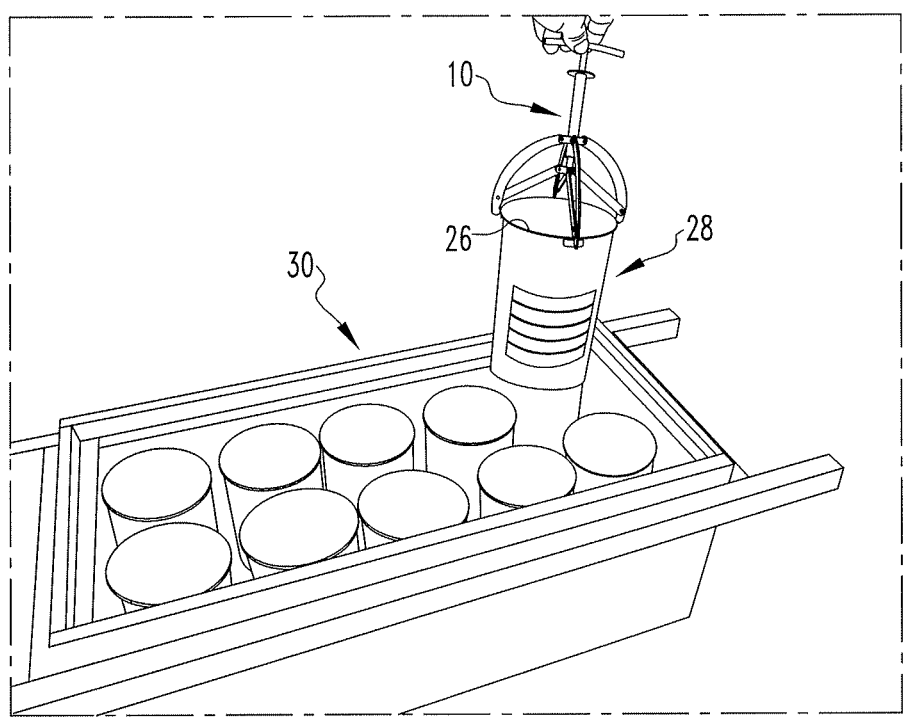

As shown in FIG. 3, grapple type device 10 allows the person to place cylinder molds 28 in cure box 30 more accurately than either the trowel method or the fingertip method. Using grapple type device 10 allows the technician to move the concrete cylinder molds faster (the technician will generally mold between eight to fifteen concrete cylinders for each separate concrete pour). Grapple type device 10 makes moving concrete cylinder molds 28 safer because of the secure grip. The tool is intended to be used to move newly filled concrete cylinder molds 28 from place of molding to cure box 30. Grapple type device 10 can also be used to carry hardened concrete cylinders in their molds. Grapple type device 10 would be further useful if used to carry demolded cylinders.

Figure 4A:
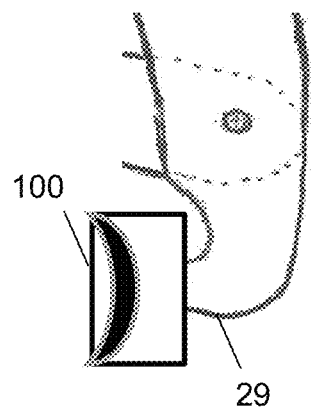
FIGS. 4A and 4B are views of a demolded concrete cylinder gripper attachment.
Figure 4B:
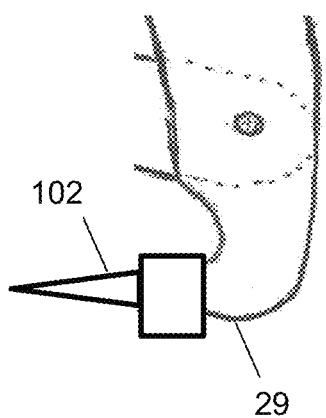

Now turning to FIGS. 4A and 4B that illustrates the demolded concrete cylinder gripper attachment that removably attaches to lifting lug 29 to move a demolded concrete cylinder. FIG. 4A illustrates a removable suction cup 100 that is configured to fit over lifting lug 29 or otherwise attach to lifting lug 29 by any conventional means. FIG. 4B illustrates a removable pin 102 that is configured to fit over lifting lug 29 or otherwise attach to lifting lug 29 by any conventional means. Although the present invention has generally been described in terms of specific embodiments and implementations, the present invention is applicable to other methods, apparatuses, systems, and technologies. The examples provided herein are illustrative and not limiting, and other variations and modifications of the present invention are contemplated. Those and other variations and modifications of the present invention are possible and contemplated, and it is intended that the foregoing specification and the following claims cover such modifications and variations.

The invention claimed is:

1. A self-aligning and engaging concrete cylinder and mold lifting tool comprising:
    a tube having a proximal end, a distal end, a through-bore from the proximal end to the distal end, and a length, wherein the through-bore includes an inner diameter;
    a longitudinal rod having a proximal end, a distal end, a length, and an outer diameter, wherein the outer diameter is smaller than the inner diameter of the through-bore of the tube such that the longitudinal rod freely traverses within the through-bore of the tube, wherein the length of the longitudinal rod is greater than the length of the tube;
    a handle connected to the distal end of the longitudinal rod such that contact of the handle with the distal end of the tube stops to traversal of the longitudinal rod through the through-bore of the tube;
    a plurality of arms, wherein each arm of the plurality of arms has a distal end and a proximal end, wherein the proximal end includes a lifting lug capable of engagement of a lower surface of a lip of a concrete cylinder mold, wherein the distal end is pivotally connected juxtaposition the proximal end of the tube; and
    a plurality of extension members, wherein each extension member includes a distal end and a proximal end, wherein the proximal end of each extension member is pivotally connected juxtaposition the proximal end of the longitudinal rod, wherein the distal end of the each extension member is pivotally connected juxtaposition the proximal end of the each arm of the plurality of arms,
    wherein the each extension member is capable of radially extending or retracting the lifting lug of the each arm along a radial path as a portion of the longitudinal rod traverses through the through-bore of the tube from the proximal end of the tube towards the distal end of the tube,
    wherein the lifting lugs of the plurality of arms are capable of being radially extended or retracted simultaneously between a first radial position and a second radial position along the radial path as the longitudinal rod traverses through the through-bore of the tube with a single movement of the handle,
    wherein the longitudinal rod, the tube, and the handle are perpendicularly oriented relative to the radial path of the lifting lug.

2. The self-aligning and engaging concrete cylinder and mold lifting tool according to claim 1, further comprising a structure having an outer diameter, a center hole with a diameter, a lower surface, and an upper surface, wherein the diameter of the center hole is greater than the outer diameter of the longitudinal rod, wherein the lower surface of the structure is configure to support two fingers of the user on opposing sides of the tube, wherein the structure is connected to the distal end of the tube, wherein the upper surface contacts the handle to stop the traversal of the longitudinal rod through the through-bore of the tube.

3. The self-aligning and engaging concrete cylinder and mold lifting tool according to claim 1, wherein the plurality of arms are two arms, and wherein the plurality of extension members are two extension members.

4. The self-aligning and engaging concrete cylinder and mold lifting tool according to claim 1, wherein the plurality of arms are three arms, and wherein the plurality of extension members are three extension members.

5. The self-aligning and engaging concrete cylinder and mold lifting tool according to claim 1, wherein the plurality of arms are four arms, and wherein the two or more extension members are four extension members.

6. The self-aligning and engaging concrete cylinder and mold lifting tool according to claim 1, wherein the plurality of arms are curve-shaped.

7. The self-aligning and engaging concrete cylinder and mold lifting tool according to claim 1, wherein the handle is arch-shaped.

8. The self-aligning and engaging concrete cylinder and mold lifting tool according to claim 1, wherein the plurality of extension members are straight.

9. The self-aligning and engaging concrete cylinder and mold lifting tool according to claim 1, wherein the proximal end of the plurality of arms includes an inwardly facing undercut adjacent to the lifting lug, wherein the inwardly facing undercut is capable of receiving the lip of the concrete cylinder mold.

10. The self-aligning and engaging concrete cylinder and mold lifting tool according to claim 1, wherein the tube further comprises a plurality of upper lugs fixedly connected substantially perpendicular to the tube in proximity of the proximal end of the tube, wherein the each arm of the plurality of arms is pivotally connected to one upper lug of the plurality of upper lugs.

11. The self-aligning and engaging concrete cylinder and mold lifting tool according to claim 1, wherein the tube further comprises a plurality of upper lugs fixedly connected substantially perpendicular to the tube in proximity of the proximal end of the tube, wherein the plurality of upper lugs are oriented in a paired configuration to form a space greater than the thickness of the each arm of the plurality of arms, wherein the each arm is received between the paired upper lugs and pivotally connected to the paired upper lugs.

12. The self-aligning and engaging concrete cylinder and mold lifting tool according to claim 1, the rod further comprises a plurality of lower lugs fixedly connected substantially perpendicular to the rod in proximity of the proximal end of the rod, wherein the each arm of the plurality of arms is pivotally connected to one lower lug of the plurality of lower lugs.

13. The self-aligning and engaging concrete cylinder and mold lifting tool according to claim 1, wherein the plurality of arms are equally spaced apart by a predetermined angular degree.

14. The self-aligning and engaging concrete cylinder and mold lifting tool according to claim 13, wherein the plurality of arms are only two arms and the predetermined angular degree is 180 degrees.

15. The self-aligning and engaging concrete cylinder and mold lifting tool according to claim 13, wherein the plurality of arms are only three arms and the predetermined angular degree is 120 degrees.

16. The self-aligning and engaging concrete cylinder and mold lifting tool according to claim 13, wherein the plurality of arms are only four arms and the predetermined angular degree is 90 degrees.

17. The self-aligning and engaging concrete cylinder and mold lifting tool according to claim 13, wherein the plurality of arms are selected from a group consisting of five arms, six arms, seven arms, and eight arms.

18. The self-aligning and engaging concrete cylinder and mold lifting tool according to claim 1, further comprising a demolded concrete cylinder gripper attachment capable of being attached to the lifting lug such that the demolded concrete cylinder gripper attachment can securely engage a demolded concrete cylinder to move the demolded concrete cylinder.

19. The self-aligning and engaging concrete cylinder and mold lifting tool according to claim 18, wherein the demolded concrete cylinder gripper attachment is a suction cup.

20. The self-aligning and engaging concrete cylinder and mold lifting tool according to claim 18, wherein the demolded concrete cylinder gripper attachment is a pin.

* * * * *